United States Patent [19]
Ingraham et al.

[11] Patent Number: 5,315,380
[45] Date of Patent: May 24, 1994

[54] APPARATUS AND METHOD FOR TRANSFORMING THE DIGITAL REPRESENTATION OF A COLOR INPUT IMAGE

[75] Inventors: John Ingraham, North Chelmsford; Brad Winslow, Nashua; Foster Fargo, Lincoln, all of Mass.

[73] Assignee: Iris Graphics Inc., Bedford, Mass.

[21] Appl. No.: 749,299

[22] Filed: Aug. 23, 1991

[51] Int. Cl.$^5$ .............................................. H04N 1/46
[52] U.S. Cl. .................................................. 358/500
[58] Field of Search ...................... 358/75, 80, 76, 78; 395/109; 364/526; 356/408, 421

[56] References Cited

U.S. PATENT DOCUMENTS

| | | | |
|---|---|---|---|
| 4,500,919 | 2/1985 | Schreiber | 358/80 |
| 4,717,954 | 1/1988 | Fujita | 358/80 |
| 4,839,721 | 6/1989 | Abdulwahab et al. | 358/80 |
| 4,959,790 | 9/1990 | Morgan | 358/80 |
| 5,107,332 | 4/1992 | Chan | 358/80 |

FOREIGN PATENT DOCUMENTS

0144188A2 of 0000 European Pat. Off. .

OTHER PUBLICATIONS

Wyszecki et al, "Color Science: Concepts and Methods, Quantitative Data and Formulae", Second Edition, John Wiley & Sons, 1982, New York pp. 507-510 only.
Engeldrum, "Almost Color Mixture Functions", J. of Imaging Technology, 14 (4), Aug., 1988 pp. 108-110.
R. Holub et al, "Color Systems Calibration for Graphic Arts", (I & II), Jou. of Imaging Tech., vol. 14, No. 2, Apr. 1988, pp. 47-60.
Marquet, "Dehalftoning of Negatives . . . ", Optica Acta 6, pp. 404-405.
Marquet et al, "Interpretation of Particular Aspects of . . . ", Optica Acta 8, 1961, pp. 267-277.
Kermisch et al, "Fourier Spectra of Halftone Images", J. Opt. Soc. Amer., 65, 1975, pp. 716-723.
J. Stoer, "Introduction to Numerical Analysis", Springer-Verlag, New York, 1980 pp. 37-116.
De Boor, "A Practical Guide to Splines", Applied Math. Sciences, vol. 27, Springer-Verlag, New York, 1978 pp. 1-63.
Bartels et al, "An Introduction to Splines . . . ", Morgan Kaufmann Publishers Inc., Los Altos, Calif., 1987, pp. 9-66.
R. K. Molla, "Electronic Color Separation", R. K. Printing & Publishing, New York, 1988 pp. 204-220.
G. Wyszecki et al, "Color Science", Wiley & Sons, 1982.
Stone et al, "Color Gamut Mapping and the Printing of Digital Color Images", ACM Trans. on Graphics, 7(4), Oct. 1988, pp. 249-292.

Primary Examiner—Edward L. Coles, Sr.
Assistant Examiner—Scott A. Rogers
Attorney, Agent, or Firm—Ladas & Parry

[57] ABSTRACT

A system for converting a first representation of a color input image to a second representation and method for performing same are disclosed. The system includes apparatus for mapping primary axes and overprint axes of a selected color coordinate system to primary axes and overprint axes of a printer color coordinate system of the second representation, thereby to produce primary conversion tables and overprint conversion tables and apparatus for converting the first representation to the second representation utilizing the primary and overprint conversion tables. The system also includes printing apparatus for printing the second representation and for producing an output print, wherein the output print is a reproduction of the color input image within the selected color coordinate system. Furthermore, the system enables selection of operator-selected appearance parameters used to match desired printer conditions in accordance with the appearance parameters.

20 Claims, 9 Drawing Sheets

APPARATUS AND METHOD FOR TRANSFORMING THE DIGITAL REPRESENTATION OF A COLOR INPUT IMAGE

FIELD OF THE INVENTION

The present invention relates generally to techniques for tone and color reproduction control in graphic arts.

BACKGROUND OF THE INVENTION

The properties of color are described, inter alia, in the following two books:

*Color Science: Concepts and Methods, Quantitative Data and Formulae*, Second Edition, by G. Wyszecki and W. S. Stiles, John Wiley and Sons Inc., New York, 1982; and

*Principles of Color Technology*, Second Edition, by F. W. Billemeyer, Jr. and M. Saltzman, John Wiley and Sons Inc., New York, 1981.

Principles of color reproduction are described in the book *Principles of Color Reproduction* by J. A. C. Yule, John Wiley and Sons Inc., New York, 1967.

Systems producing color images are known in the art. There are known color separation systems, which scan an original image existent on some medium, such as film or paper, and provide, on output, a digital representation of the original image. There also are known color drawing systems, typically computer based, with which an operator electronically produces an original color image, displayed to the operator on a monitor. The color drawing systems generate the digital representation of the original color image.

The digital representations thus produced are typically provided to a color printing device for reproduction of the original color images. This involves conversion of the digital representations to colorants, such as inks. However, the color of a colorant having a given digital value typically does not closely match the color of the original color image for which the color system generated the given digital value.

Therefore, systems are known in the art which modify the digital representation such that the digital value provided to the color printing device will produce the desired color.

A typical system is described in U.S. Pat. No. 4,500,919 to Shreiber. The system comprises a scanner for scanning an original and producing "appearance signals", a digital representation of the original, a monitor for displaying the appearance signals and aesthetic correction circuitry for interactively modifying the appearance signals as desired. The modified appearance signals are then provided to a colorant selection mechanism for selecting the appropriate colorant which matches the modified appearance signals.

SUMMARY OF THE INVENTION

It is an object of the present invention to provide a system and method for transforming the digital representation of a color input image which is generally not computer-intensive.

There is therefore provided, in accordance with an embodiment of the present invention, a system for converting a first representation of a color input image to a second representation. The system includes apparatus for mapping primary axes and overprint axes of a selected color coordinate system to primary axes and overprint axes of a printer color coordinate system of the second representation, thereby to produce primary conversion tables and overprint conversion tables and apparatus for converting the first representation to the second representation utilizing the primary and overprint conversion tables.

There is also provided, in accordance with an embodiment of the present invention, a system for converting a first representation of a color input image to a second representation. The second representation is matched to a selected color coordinate system and the first and second representations include primary color components. The system includes a first plurality of primary conversion tables each converting between a primary color component of the first representation and color components of a third representation, a second plurality of overprint conversion tables for converting between an overprint color of the first representation and adjustment color components of the third representation and summing apparatus for summing the respective primary and adjustment color components outputs of the primary and overprint conversion tables thereby to produce color component values of the second digital representation.

Additionally, in accordance with an embodiment of the present invention, the system includes printing apparatus for printing the second representation and for producing an output print such that the output print is a reproduction of the color input image within the selected color coordinate system.

Moreover, in accordance with an embodiment of the present invention, the system includes apparatus for defining operator-selected appearance parameters and the apparatus for mapping includes apparatus for matching desired printer conditions in accordance with the appearance parameters. The operator-selected appearance parameters are independent of the color properties of a printer, a print medium or inks. In contrast, the color coordinate systems are dependent on the color properties of a printing method, a print medium and inks. The primary conversion tables and the overprint conversion tables incorporate the operator-selected appearance parameters.

Further, in accordance with an embodiment of the present invention, the apparatus for mapping includes apparatus for matching color of a plurality of reference step wedges in the printer color coordinate system to color of a small number of step wedges in the selected color coordinate system wherein the step wedges in the selected color coordinate system have color values along the primary and overprint axes of the selected color coordinate system.

Still further, in accordance with an embodiment of the present invention, the overprint conversion tables provide adjustment to output of the primary conversion tables.

There is additionally provided, in accordance with an embodiment of the present invention, a method for converting a first representation of a color input image to a second representation. The method includes the steps of mapping primary axes and overprint axes of a selected color coordinate system to primary axes and overprint axes of a printer color coordinate system of the second representation, thereby producing primary conversion tables and overprint conversion tables and converting the first representation to the second representation utilizing the primary and overprint conversion tables.

Additionally, in accordance with an embodiment of the present invention, the method includes the steps of printing the second representation and producing an output print such that the output print is a reproduction of the color input image within the selected color coordinate system.

Moreover, in accordance with an embodiment of the present invention, the method includes the step of defining operator-selected appearance parameters. The step of mapping includes the step of matching desired printer conditions in accordance with the appearance parameters. The operator-selected appearance parameters are independent of the color properties of a printer, a print medium or inks. However, the color coordinate systems are dependent on the color properties of a printing method, a print medium and inks.

Further, in accordance with an embodiment of the present invention, the step of mapping includes the step of matching the color of a plurality of reference step wedges in the printer color coordinate system to the color of a small number of matchable step wedges in the selected color coordinate system such that the matchable step wedges have color values along the primary and overprint axes of the selected color coordinate system.

Still further, in accordance with an embodiment of the present invention, the step of matching produces primary and overprint inking tables such that each output value of the overprint inking tables is the error between a measured color of a step wedge along the overprint axes in the selected color coordinate system and a calculated value based on a function of corresponding output values in related primary inking tables.

Additionally, in accordance with an embodiment of the present invention, the function is the sum of output values of two related primary inking tables. Furthermore, the overprint inking tables are indexed according to the minimum value of two related primary colors.

Moreover, in accordance with an embodiment of the present invention, the overprint conversion tables provide adjustment to output of the primary conversion tables.

Finally there is provided, in accordance with an embodiment of the present invention, a method for converting a first digital representation of a color input image to a second digital representation where the second digital representation is matched to a selected color coordinate system. The first and second digital representations include at least three color components. For each pixel in the input image, the method includes the steps of providing each of the color components of the first digital representation to respective primary conversion tables producing from each color component of the first digital representation a plurality of primary color components of a third digital representation, producing overprint values from at least two of the color components of the first digital representation and providing the overprint values to respective overprint conversion tables producing from each overprint value a plurality of adjustment color components of the third digital representation and summing together the respective primary and adjustment color components of the third digital representation produced from the steps of providing and producing thereby to produce color component values of the second digital representation.

BRIEF DESCRIPTION OF THE DRAWINGS

The present invention will be understood and appreciated from the following detailed description, taken in conjunction with the drawings in which.

FIGS. (constituted by FIGS. 1A and 1B) 1 is a schematic illustration of a system for converting an input digital representation to a printable output digital representation, constructed and operative in accordance with a preferred embodiment of the present invention.

Figure 2:
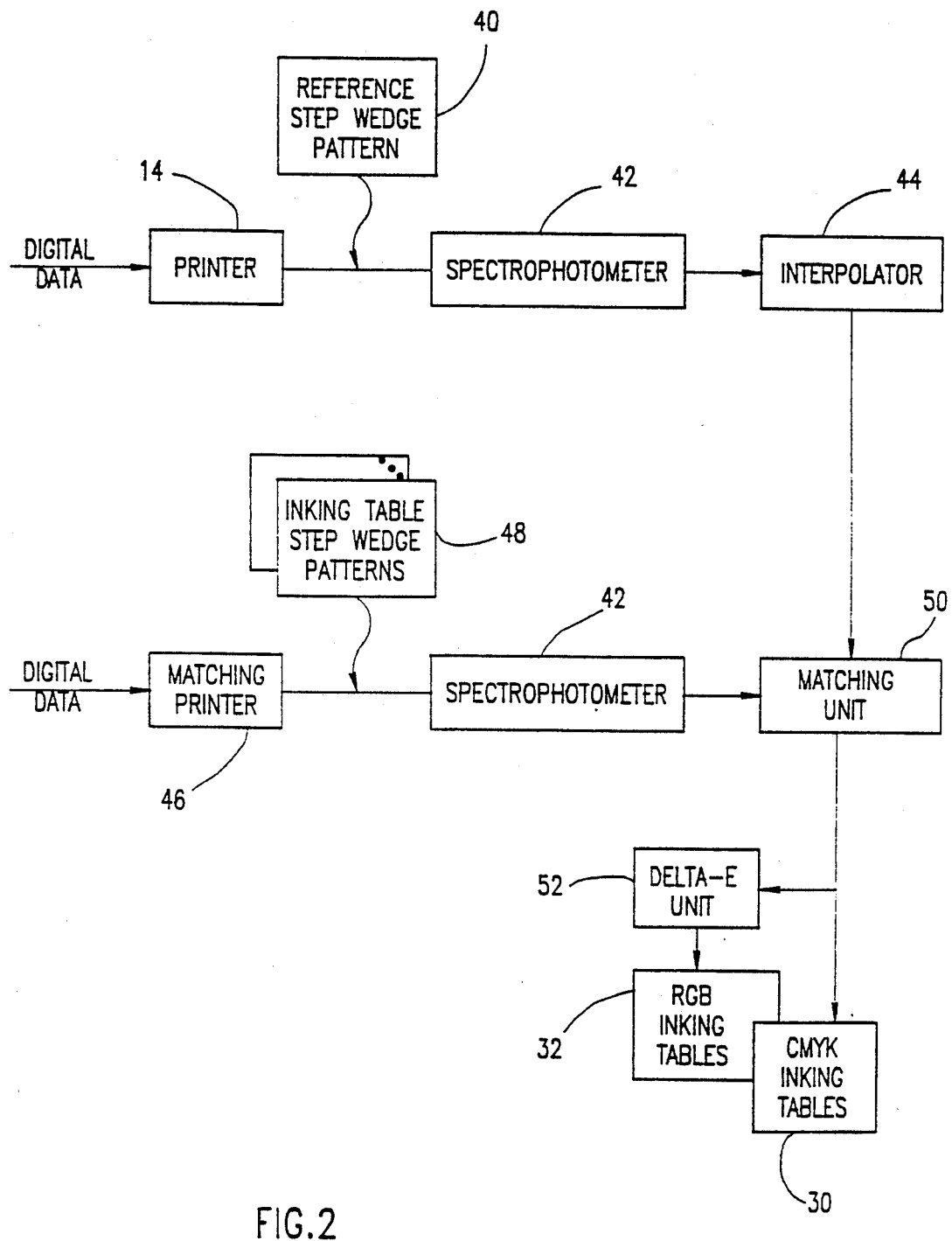
FIG. 2 is a block diagram illustration of a system for generating inking tables for use in the system of FIG. 1.
Figure 3:
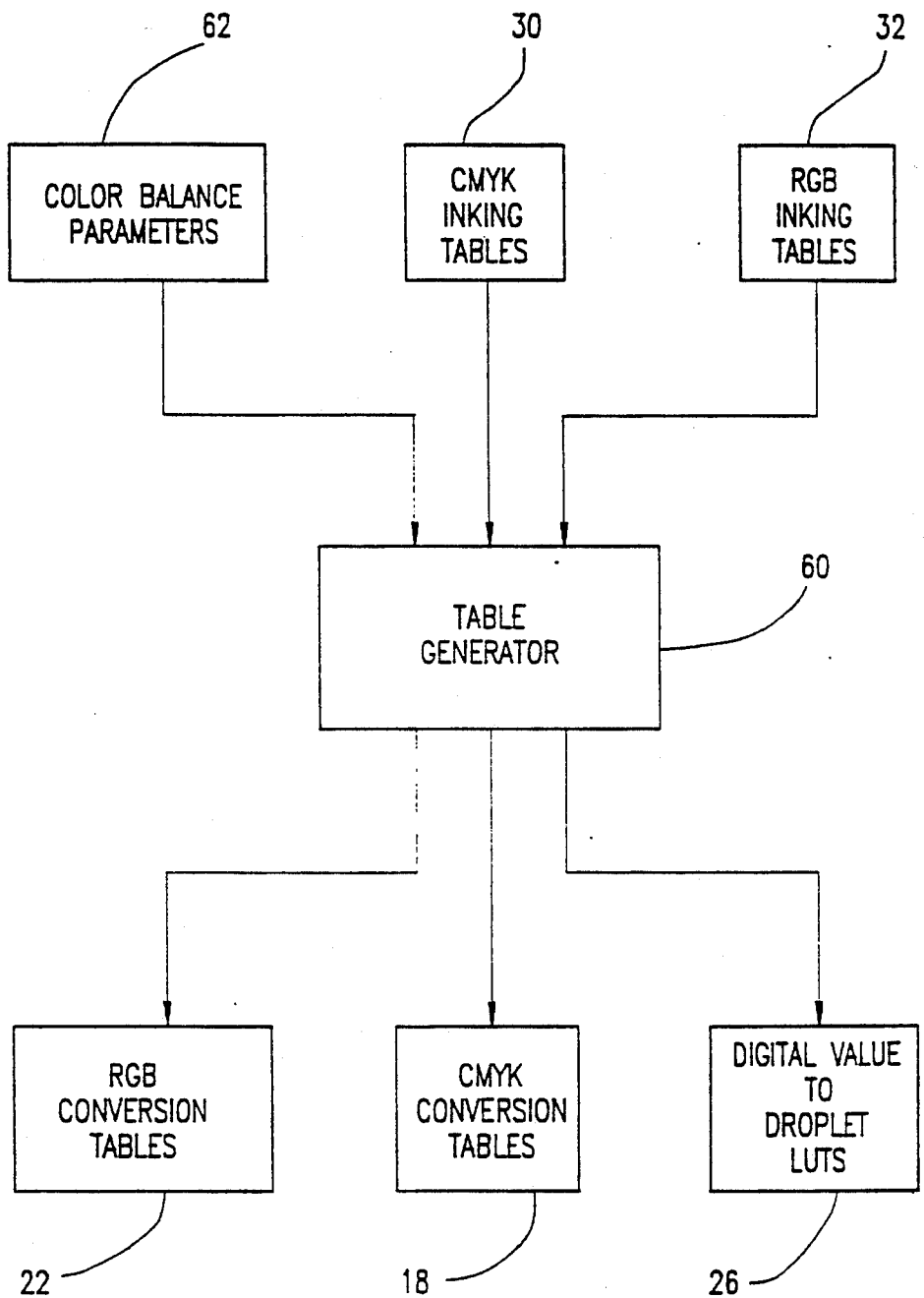
FIG. 3 is a block diagram illustration of a system for providing color conversion tables for converting a color in one digital representation to a color in a second digital representation and ink conversion tables for converting a color in the second digital representation to an ink volume value for printing, the system of FIG. 3 being useful in the system of FIG. 1.
Figure 4A:
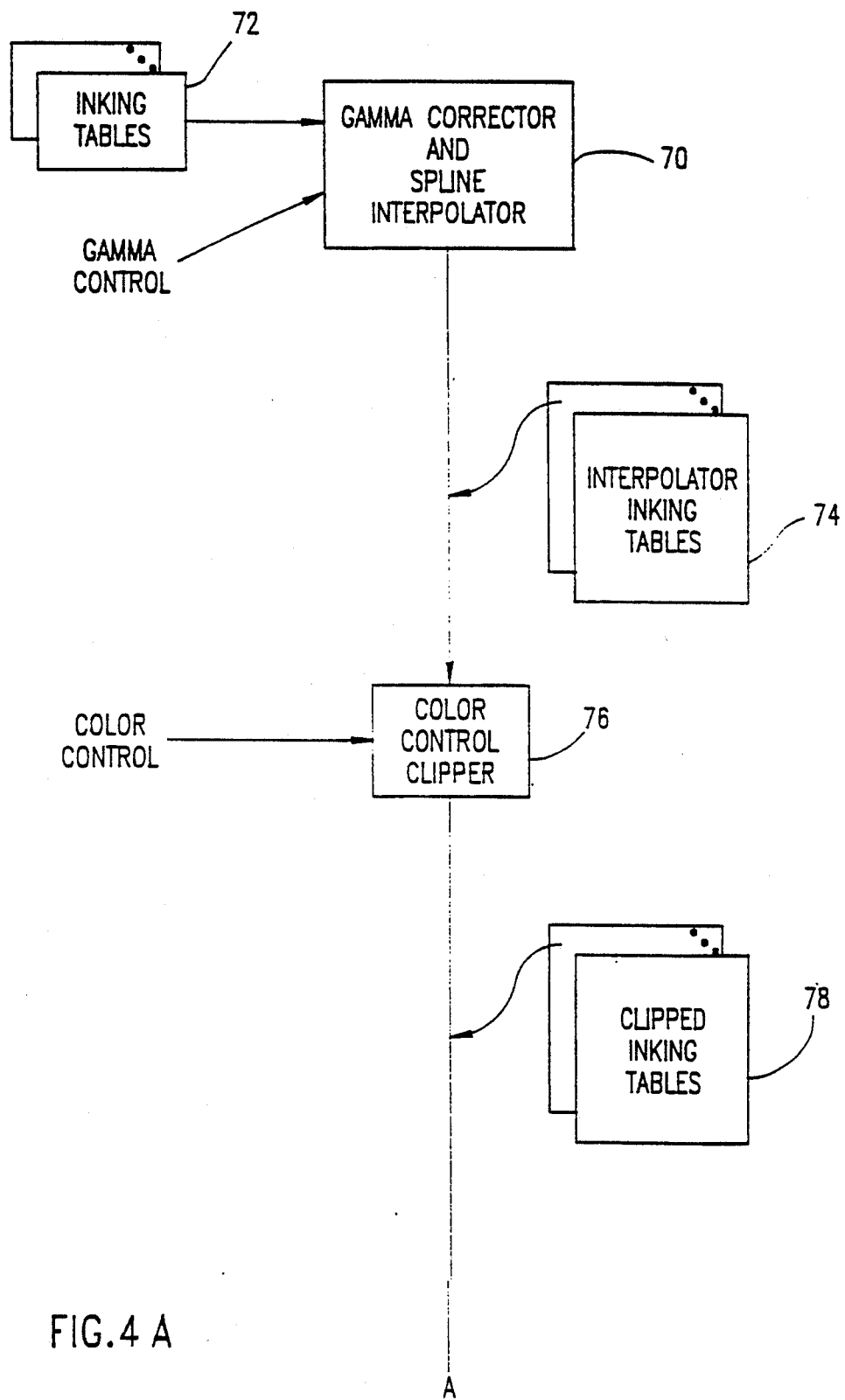
Figure 4B:
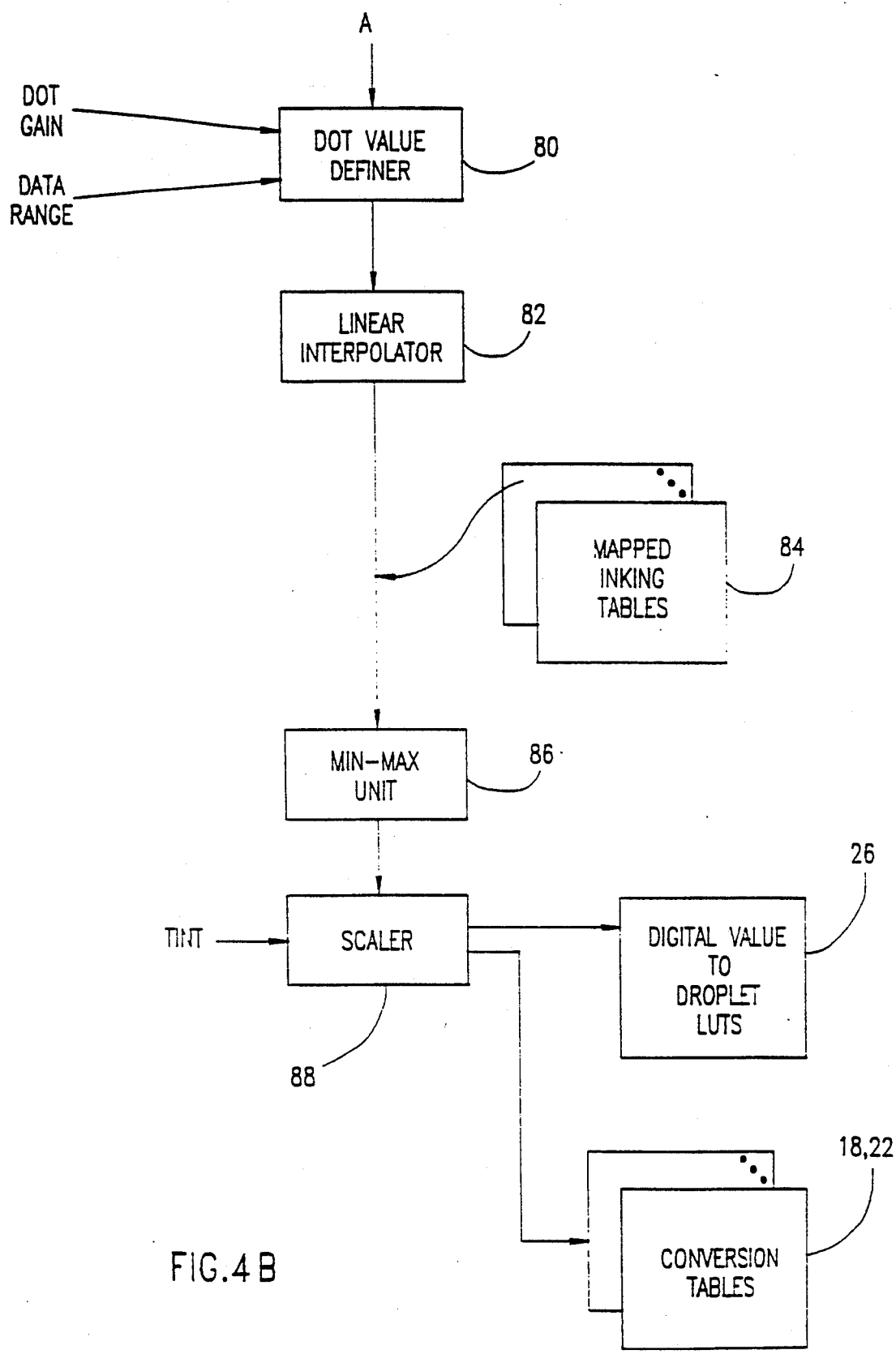
Figure 5:
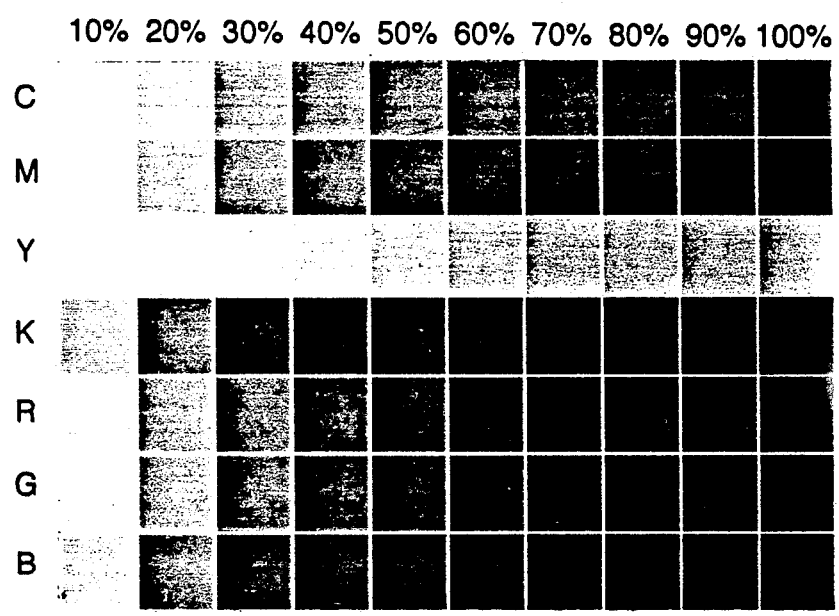
Figure 6:
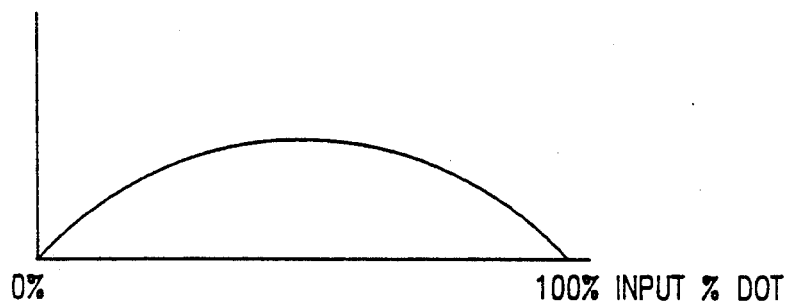
Figure 7A:
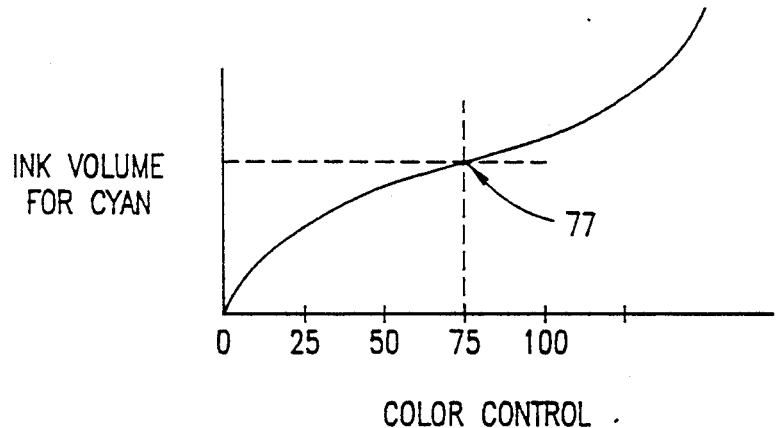
Figure 7B:
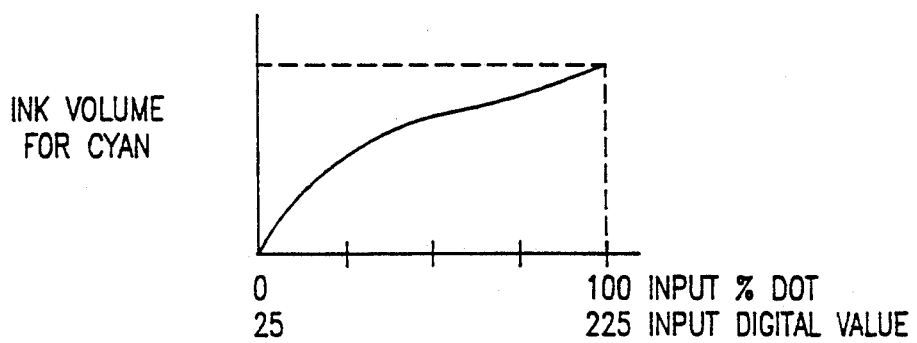
Figure 7C:
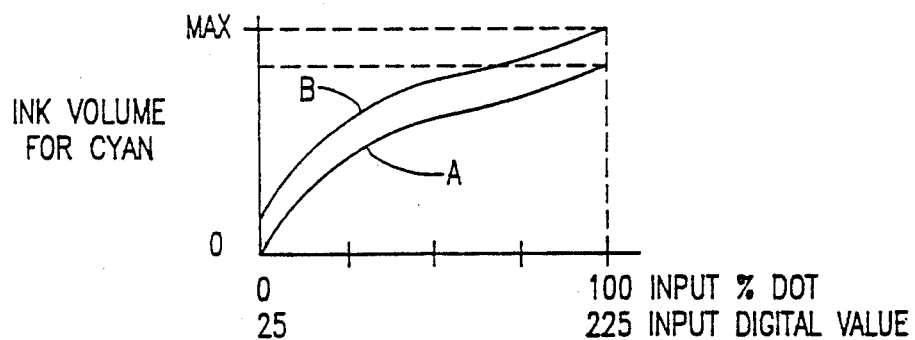

FIG. (constituted by FIGS. 4A and 4B) 4 is a block diagram illustration of a system for generating the color conversion tables of FIG. 3;

FIG. 5 is a color illustration of a step wedge pattern for producing the inking tables of FIG. 2;

FIG. 6 is a graph illustration of dot gain curves useful in the system of FIG. 3;

FIG. 7A is a graphical illustration of the cyan inking table 30, where the abscissa is a range of color control values, in percent dot values, and the ordinate is the ink volume for the cyan component;

FIGS. 7B and 7C are graphical illustrations of intermediate stages in producing the cyan conversion table 18, where the abscissa is the input percent dot values and the ordinate is the ink volume of the cyan component;

DETAILED DESCRIPTION OF A PREFERRED EMBODIMENT

Figure 1A:
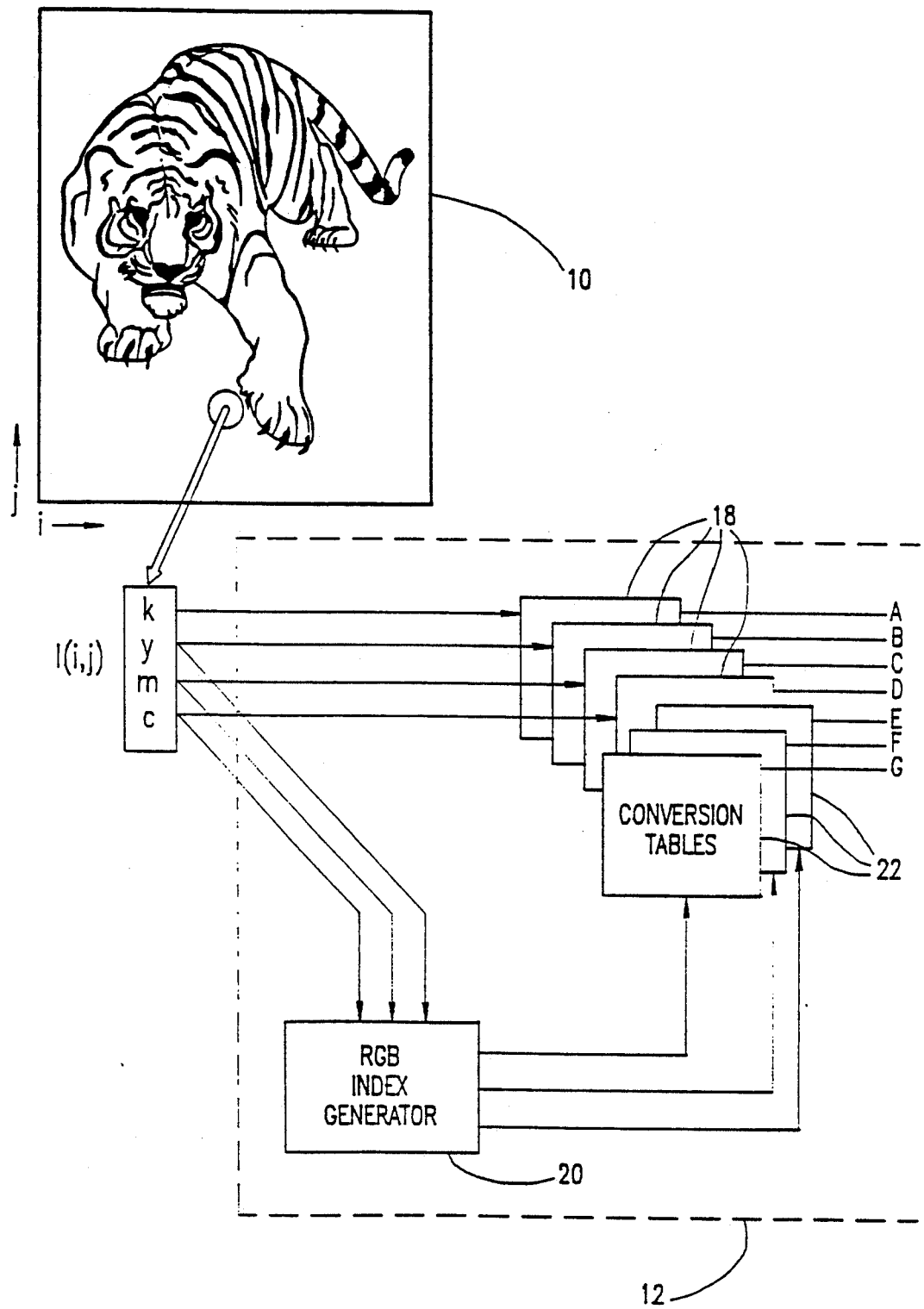
Figure 1:
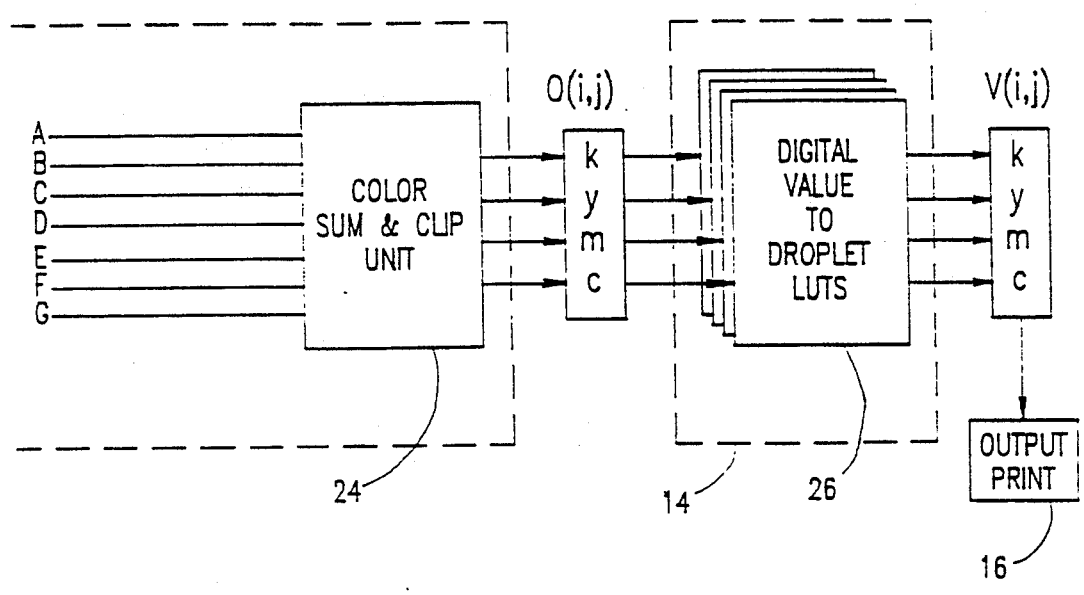

Reference is now made to FIGS. 1A and 1B which illustrates a system for converting an input digital representation of an image 10 to a printable output digital representation, constructed and operative in accordance with a preferred embodiment of the present invention. FIGS. 1A and 1B will be described as operating on one pixel. It is understood that the process described hereinbelow is repeated for each pixel in the input digital representation.

The system of FIGS. 1A and 1B typically comprises a Front End Processor (FEP) 12 for converting the input digital representation, having input pixels $I_{ij}$, to the output digital representation, having pixels $O_{ij}$. The system also includes a printer device 14, such as the 3024 printer manufactured by Iris Graphics, Inc. of Bedford, Mass., for receiving the output representation and for converting the output representation to a volume of ink representation, having volume of ink pixels $V_{ij}$, in order to create an output print 16.

The output digital representation is defined as the representation which, when provided to printer device 14, will produce output print 16 whose overall color matches that of the input image 10 generally in accordance with some predetermined metric. For example, the metric can be that the colors must match closely in Commission International de l'Eclairage (CIE) L*a*b* space. Alternatively, the metric can be that the output print must look like a standard proofing print of the input image 10, such as is produced via a known analog proofing process.

As is known in the art, each pixel $I_{ij}$ and $O_{ij}$ has an intensity which is composed of four component values, one each for cyan, magenta, yellow and black (CMYK). The input pixel values are given as percent dot (%dot) values which are the percentage of the total possible amount of ink which it is desired to print. The output pixel values are given as the ink volumes necessary to print the desired color. Both representations are represented as digital values, typically in the range 0–255.

The volume of ink representation defines, in printer terms, the specific volumes of CMY and K ink which the printer device 14 must output in order to produce the desired color.

In accordance with the present invention, each component of input pixel $I_{ij}$ is provided to a corresponding conversion table 18 for conversion to the CMYK primary color component values needed for producing that component using the colorants of the printing device 14. A typical cyan conversion table is given in Annex A.

However, the colors produced after summing the respective CMYK outputs of primary conversion tables 18 may not be accurate since the effects of overprints are not included in conversion tables 18. Therefore, overprint conversion tables 22 are utilized to correct the color which is produced as a result of using conversion tables 18.

To index the overprint conversion tables 22, the cyan, magenta and yellow components are provided to a Red-Green-Blue (RGB) index generator 20 for generating indices into overprint conversion tables 22 from the CMY components.

The intensity generator 20 can implement any suitable indexing function. For example, the functions can be as follows:

$$I_R = min(M, Y)$$
$$I_B = min(C, M) \quad (1)$$
$$I_G = min(C, Y)$$

where $I_R$, $I_G$ and $I_B$ are the indices for the red, green and blue overprint conversion tables 22, respectively.

The RGB overprint intensities thus generated are provided to the corresponding conversion tables 22 for conversion to CMYK adjustment values which adjust the CMYK values produced from tables 18 so that the overprint values of the output print 16 are correct according to the metric used. Some of the converted CMYK values can be negative if the effect of the overprint is subtractive. A typical red conversion table is given in Annex B.

Primary conversion tables 18 produce a plurality of CMYK primary color values and overprint conversion tables 22 produce a plurality of CMYK color component values relating to the RGB overprint values of the input pixel. Because the output CMYK values are additive, the respective components are summed together in sum and clip unit 24. Any values which exceed a maximum value are clipped to the maximum value and any which are less than a minimum value are clipped to the minimum value.

In addition, unit 24 performs precision reduction after the sum operation because the output of the conversion tables 18 and 22 is typically in a higher precision than necessary (11 bits versus 8 bits). The output of the conversion tables 18 and 22 is in higher precision to maintain precision during the sum operation.

Unit 24 produces the output pixel $O_{ij}$ having CMY and K color components which are sums of the respective CMY and K outputs of conversion tables 18 and 22. The output pixel $O_{ij}$ is then provided to printing device 14.

It will be noted that the output pixel $O_{ij}$ is produced in a generally non-computer intensive manner, comprising conversion lookup tables and summing operations.

Printing device 14 typically comprises a plurality of digital value to droplet LookUp Tables (LUTS) 26, one for each color component of $O_{ij}$, for converting each output pixel $O_{ij}$ to its respective ink volume pixel $V_{ij}$. Finally, the printer device 14 utilizes the $V_{ij}$ to print output print 16.

Reference is now made to FIG. 2 which illustrates a system for producing a plurality of printer-dependent CMYK inking tables 30 and a different plurality of RGB inking tables 32, useful in producing the conversion tables 18 and 22 and the LUTs 26.

The CMYK inking tables 30 are LUTs corresponding to the conversion tables 18 and the RGB inking tables 32 are LUTs corresponding to conversion tables 22. A typical cyan inking table and a typical red inking table are given in Annex C.

The cyan, magenta and yellow inking tables 30 provide a conversion, for a few points in color space, between percent dot value of the respective color component in the input digital representation and ink volume of the cyan, magenta and yellow color components in the output digital representation necessary to produce the color having the input percent dot value.

The "color having the input percent dot value" is defined with respect to the medium on which the output print 16 is produced, such as glossy or matte paper, and to a selected color coordinate system, such as Specifications for Web offset Publications (SWOP) or that of an analog proofing process.

The black inking table includes as output the ink volumes of cyan, magenta, yellow and also black color components.

The RGB inking tables 32 provide adjustments, at a few points in color space, to the output of the CMY inking tables 30 so that the overprints of the output print 16 are correct according to the metric used. The RGB inking tables 32 convert between percent of red, green or blue in the input digital representation and percent ink volume of cyan, magenta and yellow to be added or subtracted to provide the necessary correction.

It will be noted that inking tables 30 and 32 are printer, print medium, and matched color coordinate system dependent. They are produced as described hereinbelow.

Digital data, in ink volumes, are provided to printing device 14 for printing a plurality of step wedges representing generally the entirety of the gamut and palette producible on printer device 14. The distance between step wedges is typically fairly small.

The output is a reference step wedge pattern 40 typically having 1000 step wedges, although fewer or more wedges can be utilized as desired.

The color of each step wedge, in the color coordinate system CIE L*a*b*, is measured with a spectrophotometer 42, such as the SPM100 manufactured by Gretag of Switzerland. The measured colors, called the "colorimetry data", and the corresponding digital data which produced them are provided to an interpolator 44 which interpolates the data to produce interpolated colorimetry data between measured colorimetry data. Typically, the interpolation is a linear interpolation although other, suitable, interpolation methods can be performed. The output is a large plurality of colorimetry data.

Second digital data, also in ink volumes, is provided to a second printing device 46, such as one performing an analog proofing process. The second digital data typically defines a small multiplicity of step wedges for each one of inking tables 30 and 32, thereby producing a plurality of inking table step wedge patterns 48. For each inking table step wedge pattern 48, only one color component varies.

Example step wedge patterns 48 are shown in FIG. 5 to which reference is now briefly made. The percentage dot for each color is listed on the top of FIG. 5 and the inking table to which it refers is listed on the left side. As can be seen, the step wedges are printed in steps of 10%. Larger or smaller steps can be used as desired.

The first four patterns 48 print varying percentages of cyan, magenta, yellow and black inks. The last three patterns print varying percentages of the colors red, green and blue where, as is known in the art, the red, green and blue values are defined as follows:

$$R = f_R(M, Y)$$

$$B = f_B(C, M) \quad (2)$$

$$G = f_G(C, Y)$$

For example, the functions can be defined as:

$$f_R(M, Y) = M + Y$$

$$f_B(C, M) = C + M \quad (3)$$

$$f_G(C, Y) = C + Y$$

Typically, the printing medium is identical to that used to print reference step wedge pattern 40.

Reference is now made back to FIG. 2. Spectrophotometer 42 measures the color in CIE L*a*b*, of each of the step wedges of patterns 48. The colorimetry data and corresponding digital data are provided to a matching unit 50 for matching the colorimetry data of the inking table step wedge patterns 48 to that of the reference step wedge pattern 40.

For each inking table step wedge of the cyan, magenta, yellow or black inking tables, matching unit 50 scans the interpolated data, received from interpolator 44, for colorimetry data equivalent or closest to the colorimetry data of the inking table step wedge. The term "closest toll is used to describe the four data points which surround the step wedge data to be matched. The matching point is then interpolated, via any suitable process such as a geometric average in CIE L*a*b* space, from the four data points found.

The matching unit 50 then puts as the output values of the relevant inking table, the CMYK ink volume values matched from the interpolated data.

For the inking table step wedges for the red, green and blue step wedges, the matching unit 50 is utilized to find the matching data points. The output of matching unit 50 is then provided to a delta_E unit 52 which compares the CMY values of the matched data point to those produced when performing the relevant equation of equations 2 and 3 using the data of the relevant CMY inking tables 30. The difference between the two results, for each color component, is placed into the relevant RGB inking table 32.

For example, matching unit 50 matches the 10% red value to the CMY values (0.1, 2.5, 4.0). From equation 3, it is known that red is the sum of the magenta and yellow components. Therefore, the 10% values for magenta and yellow have to be taken from their respective inking tables 30. For example, let them be: 10% magenta = (0.0, 2.3, 0.0) and 10% yellow = (0.0, 0.0, 3.0). The difference between their sum and the 10% red value is then (0.1, 0.2, 1.0), which is the value which is entered into the 10% value of the red inking table 32.

The inking tables 30 and 32 thus produced define mappings along the primary and overprint axes, respectively, of the color coordinate system of printer device 46 to those of printer device 14, for a small multiplicity of color points.

The inking tables 30 and 32 are utilized, as described hereinbelow with reference to FIGS. 4A and 4B, to calculate conversion tables 18 and 22 and LUTs 26.

Reference is now made to FIG. 3 which illustrates a table generator 60 for producing the color conversion tables 18 and 22 and the digital value to droplet LUTs 26. Table generator 60 produces conversion tables 18 and 22 and LUTs 26 from inking tables 30 and 32 and from a plurality of printer-independent, operator-defined color balance parameters 62, such as color control, dot gain, tint control, data spread and gamma control.

Color control is a set of global adjustment parameters which alters the percentage of ink across the output print 16. In this manner, the gamut of the color space of the output print 16 can be controlled.

For example, if the operator sets color control to 50%, then only that data in the inking tables 30 and 32 at or below the 50% percent dot value will be utilized. The color control parameters are defined for each of the CMYK components.

As known in the graphics arts industry, dot gain is the percent increase in dot area between separation films formed from scanning an input original and an output press print. It is typically defined for a midtone dot, such as a 50% dot. For example, a 22% dot gain added to a 50% dot means that a 50% dot on film has the appearance of a 72% dot on the print 16.

Dot gains are typically implemented with dot gain curves. The dot gain curves provide maximum color changes in the midtone and small color changes in other ranges. There is typically one dot gain curve for each CMYK color component and the dot gain parameter values are defined for one midtone dot. An example dot gain curve for the cyan component is shown in FIG. 6. In the present invention, the dot gain adjustment is applied parabolically around the 50% dot.

Dot gain parameters, $DG_i$, for the overprints red, green and blue are defined as follows:

$$DG_R = 0.5 \, (DG_M + DG_Y)$$

$$DG_B = 0.5 \, (DG_C + DG_M) \quad (4)$$

$$DG_G = 0.5 \, (DG_C + DG_Y)$$

As for the primary dot gain adjustment, the overprint dot gain adjustment is applied parabolically around the 50% dot.

The tint control parameter controls the white point of the print 16 for the purpose of matching the color of a selected print medium. For example, the operator desires a print which looks like the output of an analog proofing process, such as the MATCHPRINT process by 3M of the U.S.A., which process utilizes a print medium which is slightly yellow. Since the color of the print medium used with printer 14 might not have the same tint, for example, it might be slightly blue, the operator should select values for tint control to add some yellow to the overall color of the print 16.

The operator can select tint correction in each of the color components, cyan, magenta, yellow and black, typically within the range of 0–10% dot values.

As mentioned hereinabove, the input representation is defined in percent dot values which are typically represented as digital values. The spread of digital values depends on the machine which produced the input image 10. A typical data spread is 0–255 although other spreads, such as 25–225 or 28–228 are known in the art. The data spread parameter is provided to identify to the system the spread of data values in the input representation. The spread of the output representation is typically fixed, typically as 0–255.

Some color producing systems provide correction to their input representation to correct for known color changes caused when the image is displayed on a display. This is known as "gamma correction" and the extent of the correction depends on a value of gamma.

For the present invention, a gamma corrected input representation is not in the proper format. Therefore, the gamma control parameter is provided to indicate to the system of the present invention the inverse value of the gamma used to correct the data initially. The present invention will provide inverse gamma correction.

The color balance parameters described hereinabove are operator-defined and are operative for all types of images which the operator may want to print. They are not printer-, media- or ink-dependent.

In accordance with the present invention, the operator first defines the color balance parameters. Then he chooses a set of inking tables 30 and 32 corresponding to the type of printing medium and color coordinate system he would like to match. With this data, the table generator 60 generates the conversion tables 18 and 22 and the LUTs 26.

If the operator desires to change the type of printing medium to match, he selects the appropriate inking tables 30 and 32 and the table generator 60 will generate new conversion tables 18 and 22 and LUTs 26 with the previous color balance parameter values.

Reference is now made to FIGS. 4A, 4B and 7A–7C which respectively illustrate the elements of table generator 60 and its operation on the data in the inking tables. FIGS. 7A and 7B illustrate the process for the cyan component and are one-dimensional graphical illustrations of a multi-dimensional process.

The table generator 60 comprises a gamma corrector and spline interpolator unit 70. Unit 70 first performs gamma correction to the data points in each of the inking tables 30 and 32, together denoted tables 72, in accordance with the operator-defined gamma control parameter.

Unit 70 then interpolates between the few data points in each of the tables 70, typically utilizing a B-spline interpolation, described in the book *Fundamentals of Interactive Computer Graphics*, by J. D. Foley and A. Van Dam and published by Addison-Wesley Publishing Co., Massachusetts, 1983.

The interpolator 70 produces interpolated inking tables 74, corresponding to the inking tables 72, generally having a fine resolution. In FIG. 7A, the data points from inking tables 72 are shown with stars and the interpolated data are shown by the solid line.

A color control clipper 76 receives the color control parameters and the interpolated inking tables 74 and clips off the data which is above the space defined by the color control parameters. This defines the extent of the domain and range of the resultant color conversion tables and is shown in FIG. 7A by the dotted lines.

For the interpolated inking tables 74 related to the CMYK inking tables 30, the space to be clipped is defined by the corresponding color control parameter. For those tables 74 related to the RGB inking tables 32, the space to be clipped is defined by the relevant color control parameter $CC_i$ calculated as follows:

$$CC_R = 0.5\,(CC_M + CC_Y)$$

$$CC_B = 0.5\,(CC_C + CC_M) \qquad (5)$$

$$CC_G = 0.5\,(CC_C + CC_Y)$$

The resultant clipped inking tables 78 form the basis of the conversion tables 18 and 22 and the LUTs 26. They and the data spread and the dot gain parameters are provided to a dot value definer 80 for mapping the new domain of the clipped tables 78 to the spread of digital values defined by the data spread parameter, which spread is now defined covering the domain of 0% –100% dot values. This mapping is shown in FIG. 7B.

For example, if the data spread is 25–225 and the cyan clipped table 78 is clipped to a maximum color control value of 75% dot, then the 75% color control dot has a digital value of 225 which is indexed as the 100% input dot value, the 0% dot has the digital value of 25 and the remaining entries are mapped within the given domain and in accordance with the relevant dot gain curve.

The dot gain parameter is utilized to shift the locations of the input percent dot values. As shown in FIG. 6, the dot gain curve relates input percent dot to the amount of shift, or the dot gain value. Therefore, for a given input percent dot value, the new input percent dot value is the given input percent dot value plus the dot gain value. The resultant curve is shifted parabolically to the right and is illustrated in curve A of FIG. 7C.

The resultant mapped tables typically do not have data points for all of the possible values within the data spread. Therefore, a linear interpolator 82 then operates on the output of the definer 80 to provide values for the entirety of data points within the data spread, thereby producing fully mapped inking tables 84.

A min-max unit 86 searches each table 84 for the minimum and maximum ink volumes of each component of the output representation. From the maxima of the primary tables of tables 84, the min-max unit 86 finds a global primary maximum ink volume for the components, CMYK, and from the maxima of the overprint tables of tables 84, the min-max unit 86 finds a global overprint maximum ink volume for the components CMY. The maxima information is provided to a scaler 88 for scaling the output entries of tables 84 and for generating the LUTs 26.

Scaler 88 adds the relevant tint values, if any, to the relevant global primary and overprint maximum CMYK values. This effectively shifts the curve upward by the amount of the tint, as shown in curve B of FIG. 7C.

A global maximum value for each component is found by summing the corresponding global primary and overprint maxima. The global maximum value for each component is divided by a predetermined value, which is typically the value 2047 (defining an 11 bit value), to produce scaling values which are used to scale the corresponding output entries of each of the tables 84.

For example, the global maximum value for cyan is the sum of the global maximum cyan value from the primary tables and the global maximum cyan value from the overprint tables. The cyan scale value is used to scale the entirety of cyan output data points in the entirety of tables 84.

The scaling maps the output representation values to a fixed range and ensures that the entire range is utilized despite any clipping desired by the operator. The fixed range is typically larger than the range needed for the LUTs 26. This is to maintain precision during the sum and clip operation of unit 24.

Scaler 88 also produces the LUTs 26 as follows: the input values vary from 0-255 and the output values range linearly from the global minimum value for the relevant component, typically of value 0, to the global maximum value for the relevant component.

The output of scaler 88 are the conversion tables 18 and 22 of FIGS. 1A and 1B and the LUTs 26.

Object code implementing the elements of FIGS. 4A and 4B on a 8086 microprocessor manufactured by Intel of the U.S.A. is given in Annex D.

It will be appreciated by persons skilled in the art that the present invention is not limited to what has been particularly shown and described hereinabove. Rather, the scope of the present invention is defined only by the claims that follow:

We claim:

1. A system for converting a first representation of a color input image to a second representation, the system comprising:
    means for mapping primary axes and overprint axes of a selected color coordinate system to primary axes and overprint axes of a printer color coordinate system of said second representation, thereby to produce primary conversion tables and overprint conversion tables; and
    means for converting said first representation to said second representation utilizing said primary and overnight conversion tables,
    said means for mapping comprising means for matching color of a plurality of reference step wedges in said printer color coordinate system to color of a small number of step wedges in said selected color coordinate system wherein said step wedges in said selected color coordinate system have color values along said primary and overprint axes of said selected color coordinate system.

2. A system according to claim 1 and comprising printing means for printing said second representation and for producing an output print, wherein said output print is a reproduction of said color input image within said selected color coordinate system.

3. A system according to claim 1 and comprising means for defining operator-selected appearance parameters and wherein said means for mapping comprises means for matching desired printer conditions in accordance with said appearance parameters.

4. A system according to claim 3 and wherein said operator-selected appearance parameters are independent of the color properties of a printer, a print medium or inks.

5. A system according to claim 1 and wherein said color coordinate systems are dependent on the color properties of a printing method, a print medium and inks.

6. A system according to claim 1 and wherein said overprint conversion tables provide adjustment to output of said primary conversion tables.

7. A system for converting a first representation of a color input image to a second representation, the second representation being matched to a selected color coordinate system, the first and second representations comprising primary color components, the system comprising:
    a first plurality of primary conversion tables each converting between a primary color component of said first representation and color components of a third representation;
    a second plurality of overprint conversion tables for converting between an overprint color of said first representation and adjustment color components of said third representation; and
    summing means for summing the respective primary and adjustment color components outputs of said primary and overprint conversion tables thereby to produce color component values of said second digital representation.

8. A system according to claim 7 and wherein said primary conversion tables and said overprint conversion tables incorporate operator-selected appearance parameters.

9. A system according to claim 8 and wherein said operator-selected appearance parameters are independent of the color properties of a printer, a print medium or inks.

10. A system according to claim 7 and wherein said color coordinate system is dependent on the color properties of a printing method, a print medium and inks.

11. A method for converting a first representation of a color input image to a second representation, the method comprising the steps of:
    mapping primary axes and overprint axes of a selected color coordinate system to primary axes and overprint axes of a printer color coordinate system of said second representation, thereby producing primary conversion tables and overprint conversion tables; and
    converting said first representation to said second representation utilizing said primary and overprint conversion tables,
    said step of mapping including the step of matching the color of a plurality of reference step wedges in said printer color coordinate system to the color of a small number of step wedges in said selected color coordinate system wherein said step wedges in said selected color coordinate system have color values along said primary and overprint axes of said selected color coordinate system.

12. A method according to claim 11 and comprising the steps of printing said second representation and producing an output print, wherein said output print is a reproduction of said color input image within said selected color coordinate system.

13. A method according to claim 11 and comprising the step of defining operator-selected appearance parameters and wherein the step of mapping includes the step of matching desired printer conditions in accordance with said appearance parameters.

14. A method according to claim 13 and wherein said operator-selected appearance parameters are independent of the color properties of a printer, a print medium or inks.

15. A method according to claim 11 and wherein said color coordinate systems are dependent on the color properties of a printing method, a print medium and inks.

16. A method according to claim 11 and wherein said step of matching produces primary and overprint inking tables wherein each output value of said overprint inking tables is the error between a measured color of a step wedge along said overprint axes in said selected color coordinate system and a calculated value based on a function of corresponding output values in related primary inking tables.

17. A method according to claim 16 and wherein said function is the sum of output values of two related primary inking tables.

18. A method according to claim 17 and wherein said overprint inking tables are indexed according to the minimum value of two related primary colors.

19. A method according to claim 11 and wherein said overprint conversion tables provide adjustment to output of said primary conversion tables.

20. A method for converting a first digital representation of a color input image to a second digital representation, the second digital representation being matched to a selected color coordinate system, the first and second digital representations comprising at least three color components, the method comprising the steps of:

for each pixel in said input image, providing each of said color components of said first digital representation to respective primary conversion tables producing from each color component of said first digital representation a plurality of primary color components of a third digital representation;

producing overprint values from at least two of said color components of said first digital representation and providing said overprint values to respective overprint conversion tables producing from each overprint value a plurality of adjustment color components of said third digital representation; and summing together the respective primary and adjustment color components of said third digital representation produced from said steps of providing and producing thereby to produce color component values of the second digital representation.

* * * * *